United States Patent
Filipovic

(10) Patent No.: US 7,809,087 B2
(45) Date of Patent: Oct. 5, 2010

(54) POWER DETECTION TECHNIQUES AND DISCRETE GAIN STATE SELECTION FOR WIRELESS NETWORKING

(75) Inventor: Daniel F. Filipovic, Solana Beach, CA (US)

(73) Assignee: QUALCOMM, Incorporated, San Diego, CA (US)

( * ) Notice: Subject to any disclaimer, the term of this patent is extended or adjusted under 35 U.S.C. 154(b) by 962 days.

(21) Appl. No.: 10/133,917

(22) Filed: Apr. 26, 2002

(65) Prior Publication Data

US 2004/0202133 A1 Oct. 14, 2004

(51) Int. Cl.
*H04L 25/06* (2006.01)
(52) U.S. Cl. .................................. 375/317; 375/345
(58) Field of Classification Search .......... 375/317, 375/324, 327, 345
See application file for complete search history.

(56) References Cited

U.S. PATENT DOCUMENTS

| | | | |
|---|---|---|---|
| 4,112,286 A * | 9/1978 | Alderman et al. | 219/668 |
| 5,148,449 A * | 9/1992 | Cannalte et al. | 375/318 |
| 5,222,104 A * | 6/1993 | Medendorp | 375/308 |
| 5,488,638 A * | 1/1996 | Kazecki et al. | 375/347 |
| 5,682,382 A * | 10/1997 | Shepard | 370/342 |
| 5,732,341 A * | 3/1998 | Wheatley, III | 455/234.1 |
| 5,734,974 A | 3/1998 | Callaway, Jr. et al. | 455/234.1 |
| 5,779,264 A * | 7/1998 | de Mersseman et al. | 280/735 |
| 5,781,845 A * | 7/1998 | Dybdal et al. | 455/65 |
| 5,920,589 A * | 7/1999 | Rouquette et al. | 375/147 |
| 5,974,301 A * | 10/1999 | Palmer et al. | 455/63.1 |
| 6,052,566 A | 4/2000 | Abramsky et al. | 455/67.1 |
| 6,088,382 A * | 7/2000 | Maru | 375/142 |
| 6,151,312 A * | 11/2000 | Evans et al. | 370/338 |
| 6,377,782 B1 * | 4/2002 | Bishop et al. | 455/3.01 |
| 6,438,363 B1 * | 8/2002 | Feder et al. | 455/226.4 |
| 6,628,732 B1 * | 9/2003 | Takaki | 375/345 |

(Continued)

FOREIGN PATENT DOCUMENTS

EP 1178630 A1 2/2002

(Continued)

OTHER PUBLICATIONS

Frederick J. Hill, Computer Aided Logical Design with Emphasis on VLSI, 4th Edition, p. 10.*

(Continued)

*Primary Examiner*—Emmanuel Bayard
(74) *Attorney, Agent, or Firm*—Howard Seo; Ramin Morbarhan

(57) ABSTRACT

A wireless communication device may include a receiver coupled to a modem. The receiver may receive a wireless packet according to a wireless networking protocol such as a protocol in the IEEE 802.11 family of wireless protocols. Upon receiving a packet, the receiver may processes the packet according to a selected one of a plurality of discrete gain states. The modem coupled to the receiver may select the gain state used to process the packet such as by sending one or more signals to the receiver to reduce the gain state after determining that the current gain state is too large. The modem may implement a plurality of power detection modules in order to detect signals at varying power levels. The implementation of a plurality of power detectors may allow the gain state selection process to be performed very quickly as required by some wireless networking protocols.

40 Claims, 5 Drawing Sheets

U.S. PATENT DOCUMENTS

| | | | |
|---|---|---|---|
| 6,748,200 B1* | 6/2004 | Webster et al. | 455/234.1 |
| 6,760,320 B1* | 7/2004 | Bune | 370/342 |
| 6,775,336 B1* | 8/2004 | Takaki | 375/345 |
| 6,785,523 B2* | 8/2004 | Husted et al. | 455/219 |
| 6,798,754 B1* | 9/2004 | Farhang-Boroujeny | 370/286 |
| 6,836,519 B1* | 12/2004 | Gerlach et al. | 375/345 |
| 6,888,879 B1* | 5/2005 | Lennen | 375/149 |
| 6,947,445 B1* | 9/2005 | Barnhart | 370/468 |
| 7,003,057 B2* | 2/2006 | Hasegawa | 375/345 |
| 7,027,530 B2* | 4/2006 | McFarland et al. | 375/341 |
| 7,035,285 B2* | 4/2006 | Holloway et al. | 370/474 |
| 7,305,259 B1* | 12/2007 | Malone et al. | 455/574 |
| 2001/0031962 A1* | 10/2001 | Eggleston | 606/35 |
| 2002/0021169 A1* | 2/2002 | King et al. | 330/51 |
| 2002/0061738 A1* | 5/2002 | Simmons et al. | 455/234.1 |
| 2003/0103579 A1* | 6/2003 | Webster et al. | 375/298 |
| 2003/0109274 A1* | 6/2003 | Budka et al. | 455/522 |
| 2003/0143967 A1* | 7/2003 | Ciccarelli et al. | 455/232.1 |
| 2004/0129784 A1* | 7/2004 | Iwaguchi et al. | 235/462.16 |

FOREIGN PATENT DOCUMENTS

WO      0147128 A1      6/2001

OTHER PUBLICATIONS

Abidi Asad A.: "Wireless Transceivers In CMOS IC Technology, The New Wave" VSLI and CAD, 1999. 6$^{th}$ International Conference on Seoul, South Korea, Oct. 26-27, IEEE 1999, pp. 3-10.

* cited by examiner

POWER DETECTION TECHNIQUES AND DISCRETE GAIN STATE SELECTION FOR WIRELESS NETWORKING

FIELD

This disclosure relates to wireless communication and, more particularly, to wireless local area network (WLAN) systems.

BACKGROUND

Wireless networks allow computing devices to share information and resources via wireless communications. Examples of computing devices used in wireless networks include laptop or desktop computers, personal digital assistants (PDAs), mobile phones such as cellular radiotelephones and satellite radiotelephones, data terminals, data collection devices, personal digital assistants (PDAs) and other portable and non-portable computing devices. One broad family of standards developed to facilitate wireless networking is set forth in the IEEE 802.11 standard. The original IEEE 802.11 standard provides data transfer rates of 1-2 Megabits per second (Mbps) in a 2.4-2.483 Gigahertz (GHz) frequency band (hereafter the 2.4 GHz band). However, a number of extensions to the original IEEE 802.11 standard have been developed in an effort to increase data transfer rates.

The IEEE 802.11b standard (sometimes referred to as 802.11 wireless fidelity or 802.11 Wi-Fi) is an extension of the IEEE 802.11 standard that provides 11 Mbps transmission (with a fallback to 5.5, 2.0 and 1.0 Mbps) in the 2.4 GHz band. The IEEE 802.11b standard utilizes binary phase shift keying (BPSK) for 1.0 Mbps transmission and quadrature phase shift keying (QPSK) for 2.0, 5.5 and 11.0 Mbps transmission. Complementary code keying (CCK) techniques are also employed by IEEE 802.11b in order to achieve multi-channel operation in the 2.4 GHz band for the 5.0 and 11.0 Mbps transmission rates.

The IEEE 802.11g standard is another extension of the IEEE 802.11 standard. The IEEE 802.11g standard utilizes orthogonal frequency division multiplexing (OFDM) in the 2.4 GHz frequency band to provide data transmission at rates up to 54 Mbps. The IEEE 802.11g standard also provides backwards capability with 802.11b networks. The IEEE 802.11a standard is an extension of IEEE 802.11 standard that utilizes OFDM in a 5 GHz frequency band to provide data transmission at rates up to 54 Mbps. These and other wireless networks have been developed. Additional extensions to the IEEE 802.11 standard, as well as other WLAN standards will likely emerge in the future.

Wireless networks may contain one or more access points that interface with wireless and/or wired networks. Access points may also interface wirelessly with other access points to extend the geographical size of the wireless network. In addition, wireless routers may be used in wireless networks to perform data routing functions within the wireless setting. Sometimes, both wireless routers and access points are used together to form a relatively large wireless network environment.

Wireless communication devices that support wireless networking standards may also support other communication standards, such as standards commonly used for voice communications. The voice communication standards may be based on one or more of a variety of modulation techniques, such as frequency division multiple access (FDMA), time division multiple access (TDMA), and various spread spectrum techniques. One common spread spectrum technique used in wireless voice communication is code division multiple access (CDMA) signal modulation. In CDMA, multiple communications are simultaneously transmitted over a spread spectrum radio frequency (RF) signal. Other wireless communication systems may use different modulation techniques. For example, GSM systems use a combination of TDMA and FDMA modulation techniques. These techniques are also used in other systems related to GSM systems, including the DCS1800 and PCS1900 systems, which operate at 1.8 GHz and 1.9 GHz, respectively.

Due to constraints imposed by the wireless specifications, a signal of a WLAN system may need to be trained, i.e. conditioned by signal processing components of the WCD, more quickly than signals associated with most voice communication systems. For example, in a 802.11b WLAN system, a data packet is preceded by an approximately 56 microsecond ($\mu$s) synchronization preamble used for training purposes. Of this 56 $\mu$s preamble, the wireless communication device (WCD) may be allocated approximately 36 $\mu$s for synchronizing a demodulator. Before the demodulator can be synchronized, however, the WCD may need to perform a number of tasks, including the tasks of identifying that a signal was actually received, enabling demodulation components, and adjusting the gain of one or more amplifiers used to process the RF signal.

Conventional techniques used for RF training of wireless packets typically perform gain adjustments via analog closed-loop automatic gain control (AGC). Then, once the received signal has been scaled, a signal detector can measure the strength of the scaled signal in order to determine whether the signal corresponds to a wireless packet. If so, the demodulation components can be activated to demodulate the packet.

SUMMARY

A wireless communication device (WCD) may include a receiver coupled to a modem. The receiver may receive a wireless packet according to a wireless networking protocol such as a protocol in the IEEE 802.11 family of wireless protocols. Upon receiving a packet, the receiver may process the packet according to a selected one of a plurality of discrete gain states. The modem coupled to the receiver may select the gain state used to process the packet by sending one or more signals to the receiver to reduce the gain state after determining that the current gain state is too large.

The implementation of discrete gain states as opposed to analog closed-loop automatic gain control may improve and/or simplify the WCD. However, the implementation of discrete gain states also presents a number of challenges, particularly in wireless networking settings because the amount of time allocated for RF training can be very short. Techniques outlined in greater detail below, such as implementing more than one power detection module, may facilitate the implementation of discrete gain states in a wireless network setting by reducing the time it takes to select the appropriate gain state.

Various embodiments may be implemented in software, hardware, firmware, or any combination thereof. Additional details of various embodiments are set forth in the accompanying drawings and the description below. Other features, objects and advantages will become apparent from the description and drawings, and from the claims.

DETAILED DESCRIPTION

In general, this disclosure describes a wireless communication device (WCD) configured to perform various signal processing tasks associated with wireless data communication. More specifically, a wireless communication device (WCD) including a wireless LAN (WLAN) receiver may perform signal conditioning according to discrete gain states rather than implementing conventional analog closed-loop automatic gain control. The implementation of discrete gain states may improve and/or simplify the WCD by avoiding the need for analog closed-loop automatic gain control. However, the implementation of discrete gain states also presents a number of challenges, particularly in wireless networking settings because the amount of time allocated for RF training can be very short.

In particular, for wireless networks such as IEEE 802.11b, IEEE 802.11a, and IEEE 802.11g networks, where the amount of time allocated for RF training is extremely small, the implementation of discrete gain states is very challenging. Accordingly, a number of techniques are outlined below that can decrease the time associated with RF training when discrete gain states are implemented. For example, power detection techniques implementing a plurality of power detection modules that operate according to different algorithms can be used to improve WCD performance and reduce the time associated with RF training. Additional techniques are also described. By implementing one or more of the techniques outlined in greater detail below, a WCD can receive data packets according to one or more wireless networking standards and can process the packets by selecting the appropriate gain state within the time allocated for RF training.

Figure 1:
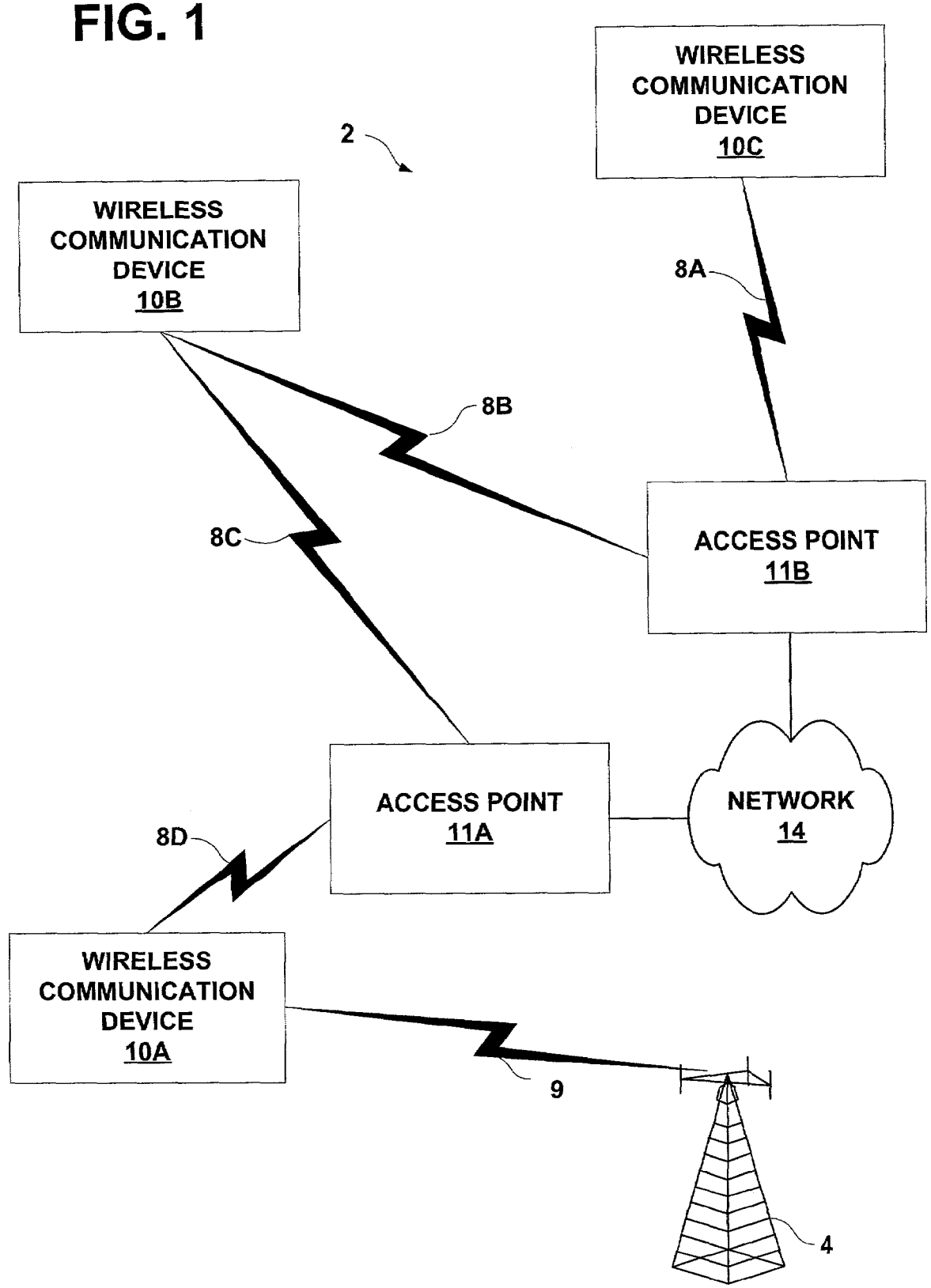
FIG. 1 is a block diagram illustrating a wireless communication system in which wireless communication devices (WCDs) can implement one or more of the techniques described herein.

FIG. 1 is a block diagram illustrating a wireless communication system 2 including a number of wireless communication devices 10A-10C, collectively referred to as wireless communication devices 10. Wireless communication devices (WCDs) 10 may be any portable computing device configured to support wireless networking. Each device may be, for example, a desktop or portable computer operating in a Windows™, Macintosh™, Unix, or Linux environment, a personal digital assistant (PDA) based on the Palm™, Windows CE, or similar operating system environments for small portable devices, or other wireless device such as a mobile radiotelephone, an interactive television, a wireless data terminal, a wireless data collection device, an Internet kiosk, a network-ready appliance for the home environment, a wireless server, and the like.

WCDs 10 communicate with one another in wireless communication system 2 via wireless signals 8A-8D (hereafter wireless signals 8). In particular, WCDs 10 may communicate according to a wireless protocol such as the protocol defined by a wireless networking standard, e.g., one of the standards in the IEEE 802.11 family of standards. Wireless signals 8 may be sent to and from the respective WCDs 10 by wireless access points 11A and 11B. The access points 11 may have wired connections to a network 14, such as a local area network, a wide area network, or a global network such as the Internet.

In addition to supporting wireless networking standards, one or more WCDs 10 within system 2 may also be configured to support one or more voice communication standards. For example, one or more base stations 4 may communicate voice data 9 to WCD 10A via voice communication techniques such as CDMA techniques, FDMA techniques, TDMA techniques, various combined techniques, and the like. For example, one or more of WCDs 10 may be designed to support one or more CDMA standards such as (1) the "TIA/EIA-95-B Mobile Station-Base Station Compatibility Standard for Dual-Mode Wideband Spread Spectrum Cellular System" (the IS-95 standard), (2) the "TIA/EIA-98-C Recommended Minimum Standard for Dual-Mode Wideband Spread Spectrum Cellular Mobile Station" (the IS-98 standard), (3) the standard offered by a consortium named "3rd Generation Partnership Project" (3GPP) and embodied in a set of documents including Document Nos. 3G TS 25.211, 3G TS 25.212, 3G TS 25.213, and 3G TS 25.214 (the W-CDMA standard), (4) the standard offered by a consortium named "3rd Generation Partnership Project 2" (3GPP2) and embodied in a set of documents including "TR-45.5 Physical Layer Standard for cdma2000 Spread Spectrum Systems," the "C.S0005-A Upper Layer (Layer 3) Signaling Standard for cdma2000 Spread Spectrum Systems," and the "C.S0024 CDMA2000 High Rate Packet Data Air Interface Specification" (the CDMA2000 standard), (5) the HDR system documented in TIA/EIA-IS-856, "CDMA2000 High Rate Packet Data Air Interface Specification, and (6) some other standards. In addition, WCDs 10 may be designed to support other standards, such as the GSM standard or related standards, e.g., the DCS1800 and PCS1900 standards. GSM systems employ a combination of FDMA and TDMA modulation techniques. WCDs 10 may also support other FDMA and TDMA standards.

Figure 2:
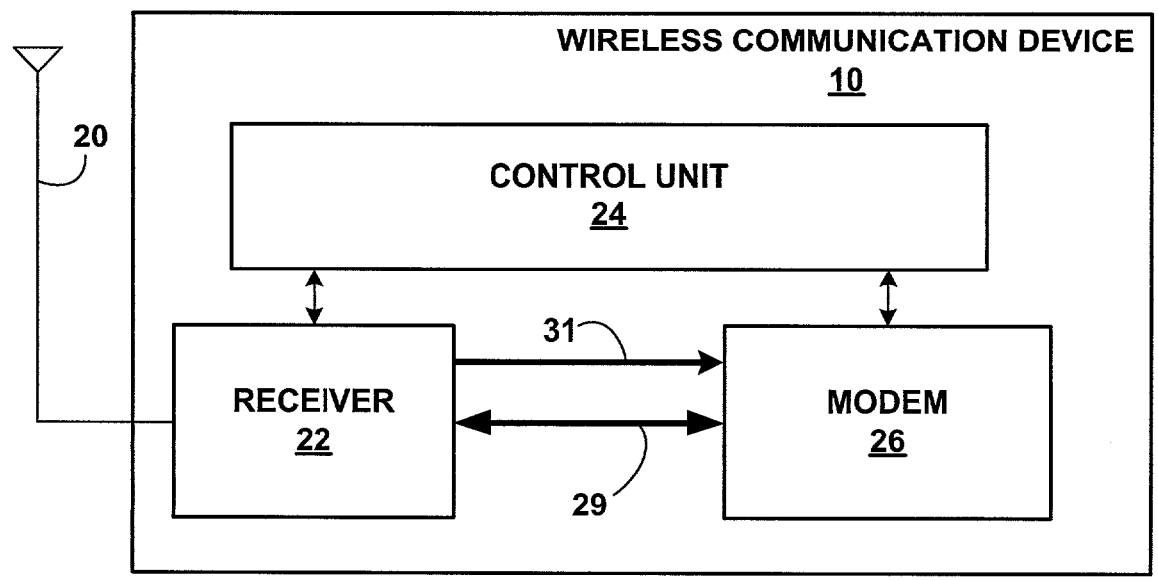
FIG. 2 is a block diagram of a WCD depicted in FIG. 1.

FIG. 2 is a block diagram of an exemplary WCD 10. As shown, WCD 10 includes an antenna 20 coupled to a receiver 22, a modem (modulator/demodulator) 26 coupled to the receiver 22 via serial bus 29 and analog transmission line 31, and a control unit 24 coupled to both the receiver 22 and the modem 26. Control unit 24 may form part of modem 26, but is illustrated separately for simplicity. In some cases, antenna 20 may be coupled to a duplexer (not shown), which is in turn coupled to both receiver 22 and a transmitter (not shown) that generates the wireless signals to be transmitted from the WCD 10. For simplicity, however, the duplexer and transmitter are not illustrated. Receiver 22 may condition a received analog signal and downconvert the received RF signal to a baseband frequency, whereas modem 26 converts the analog baseband signal to digital samples, processes the digital samples, and performs demodulation to extract the encoded data. In this disclosure, the term modem refers to a component or collection of components that can perform modulation, demodulation, or both modulation and demodulation.

Receiver 22 receives wireless RF signals in which data is modulated according to a modulation scheme used for wireless networking, such as the BPSK or QPSK modulation schemes typically implemented by devices compliant with the IEEE 802.11b wireless networking standard or the OFDM modulation scheme typically implemented by devices compliant with the IEEE 802.11g or IEEE 802.11a wireless networking standards. In any case, the received information comes in the form of data packets encoded according to the modulation scheme used. Dividing the data into packets has several advantages including enabling the sending device to resend only those individual packets that may be lost or corrupted during transmission.

Wireless networks typically operate according to a resend-until-acknowledged protocol in which the packets are resent to WCD 10 until WCD 10 acknowledges receipt of the packet. Accordingly, packets may be transmitted to WCD 10 a number of times before WCD 10 receives, processes and acknowledges reception of the packet. Packets may be received at any time, and are usually temporally separated from other packets. In other words, signals transmitted and received in wireless networks are generally not continuous signals, like continuous signals modulated for wireless voice communication. Rather, WCD 10 typically sends and receives packets in sets. The temporal separation between sets of packets presents challenges because subsequently received packets may be completely unrelated in terms of signal power levels. Accordingly, for each packet, WCD 10 may need to adjust its signal processing components to effectively demodulate the packet.

More specifically, upon receiving a wireless packet, WCD 10 adjusts its signal processing components during a short RF training period. Wireless packets may be preceded by a short preamble that is used by WCD 10 for RF training purposes. Data is not encoded in the preamble; rather, the preamble is used by WCD 10 to adjust its signal processing components so that the signal processing components are adequately adjusted to receive and demodulate the payload of the packet. The tasks performed during RF training may include DC removal, adjustment of amplifier gains, signal detection, synchronization, and possibly other tasks.

RF training is particularly challenging for wireless standards where the amount of time allocated for RF training is very small. For example, in IEEE 802.11b networks, packets are preceded by a 56 microsecond (μs) preamble used for RF training purposes. Of this 56 μs preamble, the wireless communication device (WCD) may be allocated approximately 36 μs for synchronization purposes. Before the WCD can be synchronized, however, the WCD may need to perform the tasks of identifying that a signal was actually received, enabling demodulation components, performing DC removal, and adjusting the gain of one or more amplifiers. As described in greater detail below, WCD 10 operates according to a plurality of discrete gain states rather than performing continuous gain adjustments via analog closed-loop automatic gain control. The described techniques allow gain state selection to be performed very quickly so that RF training is finished within the time allocated by the wireless networking standard.

Receiver 22 receives RF waveforms via antenna 20 according to the modulation scheme used. Receiver 22 conditions the received waveform, such as by filtering or scaling the RF waveform and mixing the waveform down to baseband. Receiver 22 may implement a zero intermediate frequency (zero IF) architecture in which the waveform is mixed directly into a baseband signal without first being mixed to an intermediate frequency (IF) signal. The techniques described below, however, are not necessarily limited to Zero IF implementations, but may also be used in implementations having one or more IF sections.

Prior to mixing the signal down to baseband (sometime referred to as the down conversion process), receiver 22 may scale the RF waveform according to a selected one of a plurality of gain states. During RF training, modem 26 may determine if the gain state is too large and may send one or more signals to receiver 22 to reduce or adjust the gain state, if necessary. In one example, the gain state selection process may involve processing a received packet according to a first gain state, detecting whether the gain state is too large, possibly reducing the gain state, detecting whether the reduced gain state is too large, possibly reducing the gain state again, and so forth. Accordingly, the gain state selection process may involve a series of incremental increases or decreases, i.e., from gain state to gain state, until an appropriate gain state has been selected. Importantly, the gain state selection process is performed within the time allocated by wireless networking standards. Techniques implementing a plurality of power detectors as outlined in greater detail below may facilitate the gain state selection process within the time allocated by wireless networking standards.

For demodulation used in IEEE 802.11b wireless networks, receiver 22 generates baseband signals for I- and Q-components of the RF signal as is well known in the art. The I-component refers to the in-phase component of the complex waveform, whereas the Q-component refers to the quadrature-phase component of the complex waveform. In both cases, receiver 22 passes the baseband signal for the respective I- or Q-components of the complex waveform to modem 26 for demodulation. For example, I- and Q-baseband signals can be sent from receiver 22 to modem 26 via analog transmission line 31. Within modem 26, the I- and Q-components are sampled by an analog to digital converter. At that point, each of the I- and Q-baseband signals may take the form of a stream of 10-bit samples. Control unit 24 may send commands to receiver 22 and modem 26 to control the processing of the received packet. In some implementations, control unit 24 forms part of modem 26.

Modem 26 may calculate power associated with the baseband signals using first and second algorithms. Modem 26 may generate a first power indicator when the power as calculated using the first algorithm exceeds a first threshold, and may generate a second power indicator when the power as calculated using the second algorithm exceeds a second threshold. First and second power detection modules may be implemented to respectively perform the first and second algorithms. By bifurcating power detection, more time can be allocated for the detection of low power signals. In other words, because the detection of low power signals will not result in the gain state being changed, integration times can be increased for low power signal detection. High power signals, on the other hand, may be detected more quickly, albeit with a lower level of accuracy in order to ensure that gain state changes, if necessary, can be performed within the time allocated by the wireless standard.

Once the RF training period is finished, modem 26 demodulates the received baseband signals. Depending on the encoding scheme with the data rate being used, modem 26 may implement demodulation techniques that exploit redundancy of the waveform used to encode the packet in order to increase processing speed. In any case, modem 26 demodulates the received packets in order to extract the payload of the packets for presentation to the user of WCD 10.

Figure 3:
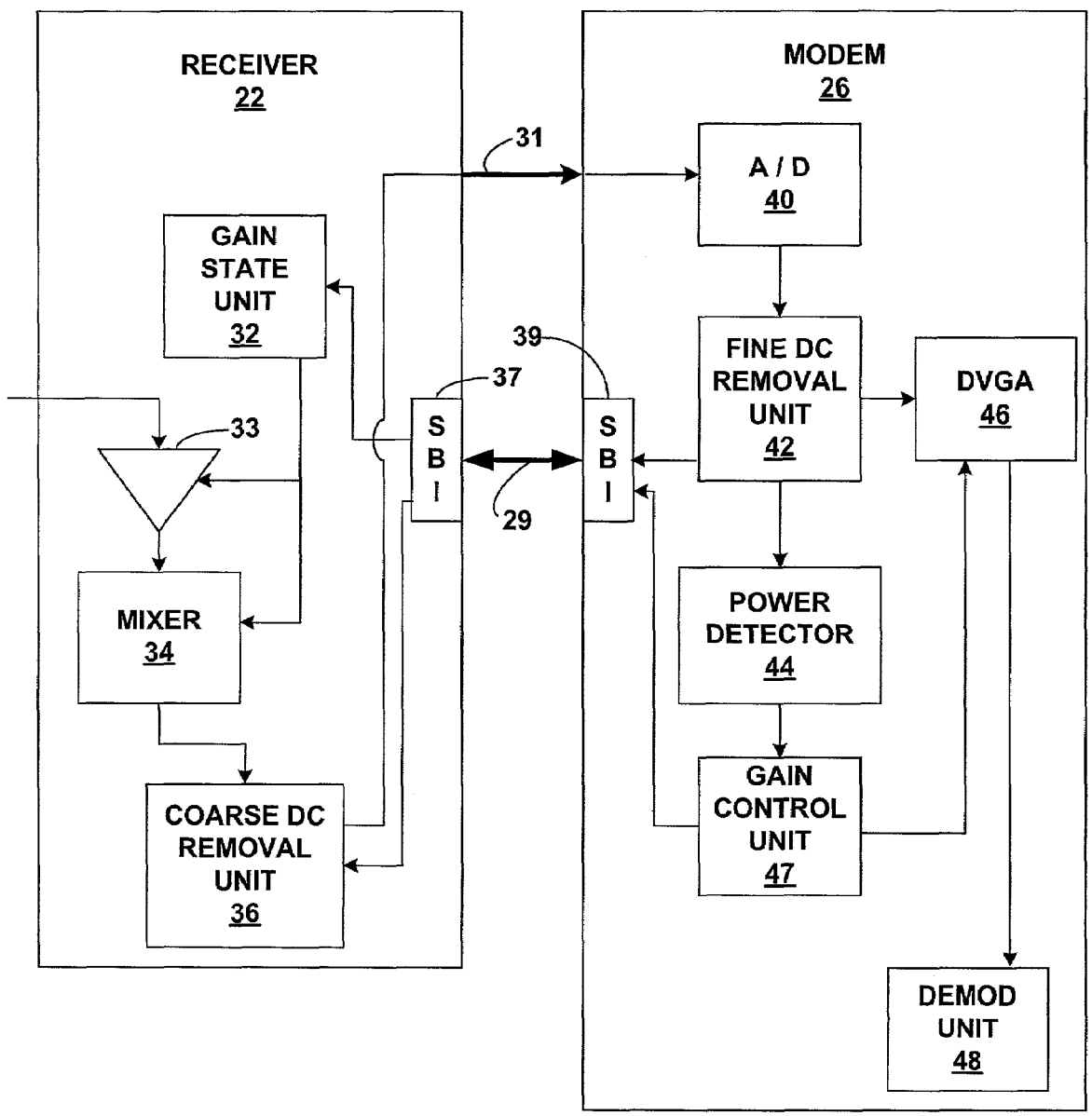
FIG. 3 is a more detailed block diagram of a receiver and modem of the WCD depicted in FIG. 2.

FIG. 3 is a block diagram illustrating in greater detail one implementation of receiver 22 coupled to modem 26. As shown, receiver 22 may include a gain state unit 32 that stores the selected gain state for processing of a received packet. Gain state unit 32, for example, may begin with the highest gain state in order to ensure that the lowest power signals can be detected and processed. As outlined in greater detail below, modem 26 identifies when the gain state is too large, and in that case, sends one or more commands to gain state unit 32 to cause gain state unit 32 to reduce the gain state. In general, the selected gain state discretely defines the gain of one or more amplifiers 33, and possibly mixer 34 within receiver 22. The implementation of discrete gain states can simplify and improve WCD 10 by avoiding the need for continuous analog closed-loop automatic gain control.

Amplifier 33 scales a received RF waveform according to the current gain state and provides the scaled signal to mixer 34. Mixer 34 receives the RF signal from amplifier 33 and mixes it down to I- and Q-baseband signals (sometimes referred to as the downconversion process). For example, mixer 34 may implement a frequency synthesizer that utilizes a local clock of WCD 10 as a timing reference. Thus, mixer 34 may remove the RF carrier component of the received RF signal to generate the baseband signals associated with the received packet. As desired, receiver 22 may also include additional components such as various filters, and the like.

Coarse DC removal unit 36 stores values indicative of an estimated DC offset associated with the received baseband signal. For this reason, coarse DC removal unit 36 can quickly remove DC from the baseband signal associated with the received packet within the time constraints imposed by certain WLAN standards. In particular, coarse DC removal unit 36 may store DC offset values associated with each of the gain states. In that case, coarse DC removal unit 36 may select the appropriate DC offset value according to the gain state identified by gain state unit 32 in order to remove the appropriate amount of DC from the baseband signal.

After coarse DC removal unit 36 has removed a DC offset in the baseband signals, the baseband signals can be sent to modem 26 for demodulation. For example, the baseband signals can be sent from receiver 22 to modem 26 via analog transmission line 31. Receiver 22 and modem 26 may also be coupled together by a serial bus 29. Accordingly, receiver 22 and modem 26 may each include a serial bus interface 37, 39 to facilitate data transmission over serial bus 29.

Upon receiving the I- and Q-baseband signals, modem 26 converts the signals to a digital representation (referred to as a digital baseband signal). In particular, analog to digital (A/D) converter 40 samples a received analog baseband signal and produces the corresponding digital baseband signal in the form of 10-bit samples. Larger or smaller A/D converters could also be used to generate the digital baseband signal in the form of larger or smaller samples. Fine DC removal unit 42 implements a DC removal loop to remove residual DC from the digital baseband signal. In addition, fine DC removal unit 42 may include a coarse DC estimator to estimate the residual DC offset associated with the baseband signal at the current gain state, and update coarse DC removal unit 36 via serial bus 29 so that subsequently received packets processed at that gain state have more appropriate DC removed by coarse DC removal unit 36. After removing the residual DC from the digital baseband signal, fine DC removal unit 42 forwards the digital baseband signals to power detector 44 and a digital variable gain amplifier (DVGA) 46.

Power detector 44 may include a plurality of power detection modules that respectively perform power detection according to different algorithms. In particular, a high power detection module may perform power detection according to a first algorithm in order to quickly identify whether a high power signal is present. If a high power signal is present, however, it may not be known whether the gain state is too large. Thus, upon detecting a high power signal, it may be necessary to adjust the gain state in gain state unit 32.

If power detector 44 detects a high power signal, gain control unit 47 may enable demodulation components of modem 26 including for example, digital voltage gain amplifier 46 and demodulation unit 48. However, if the gain state is too large, various components of modem 26 may be overloaded. For example, if the gain state is too large, A/D converter 40 may be saturated or gain control unit 47 may be unable to cause DVGA 46 to sufficiently attenuate the digital values. In either case, when one or more components of modem 26 are overloaded, gain control unit 47 sends a signal to gain state unit 32 via serial bus 29 to cause gain state unit 32 to reduce the gain state. In some cases, the high power detection module within power detector compares an accumulated estimate to a number of different thresholds in order to determine both whether a high power signal is present and whether the gain state needs to be reduced. In other words, the high power detection module within high power detector 44 may compare an accumulated power estimate to a gain state adjust threshold in order to identify whether components of modem 26 are likely overloaded.

Importantly, because power detector 44 implements a high power detection module that detects power very quickly, gain state selection can be performed within the time allocated by wireless communication standards. In some cases, a plurality of reductions to the gain state can be identified and executed within the short time allocated for RF training.

As mentioned, power detector 44 also implements a low power detection module. The low power detection module, however, may be a slower, more precise detection module because detection of a low power signal will not require a change in gain state. The additional precision of the low power detection module can improve power detection specifically for low power signals in order to better ensure that packets received at lower power are not missed by WCD 10. Still, by implementing the high power detection module in parallel, high power signals can be detected very quickly so that gain state adjustments, if necessary, can be performed within the allocated time of the RF training period.

If neither the high power detection module nor the low power detection module detects a signal, power detector 44 may send an indicator to gain control unit 47 indicating that no signal was detected. In that case, gain control unit 47 may not enable demodulation components such as DVGA 46 and demodulation unit 48 in order to conserve power. If either module of power detector 44 detects a signal, however, gain control unit 47 may enable DVGA 46, and possibly other demodulation components so that modem 26 can perform demodulation of the received packet.

In some implementations WCD 6 may incorporate multiple antennas. In that case, the output of power detector 44 may also be used select an antenna in order to improve signal reception. For example, a different antenna may be selected depending on the power level detected by power detector 44. In particular, different antennas may be selected depending on whether the high power detection module or the low power detection module within power detector 44 issues a power detection indicator. Also, different levels of power indicators may be issued by each power detection module within power detector 44.

DVGA 46 can be used to scale the digital baseband signal, either by amplifying or attenuating the digital values. In particular, DVGA 46 may perform residual gain adjustments to the digital baseband signal. After scaling the digital baseband signal, DVGA 46 then forwards the scaled digital baseband signals to demodulation unit 48 for demodulation and data extraction.

Figure 4:
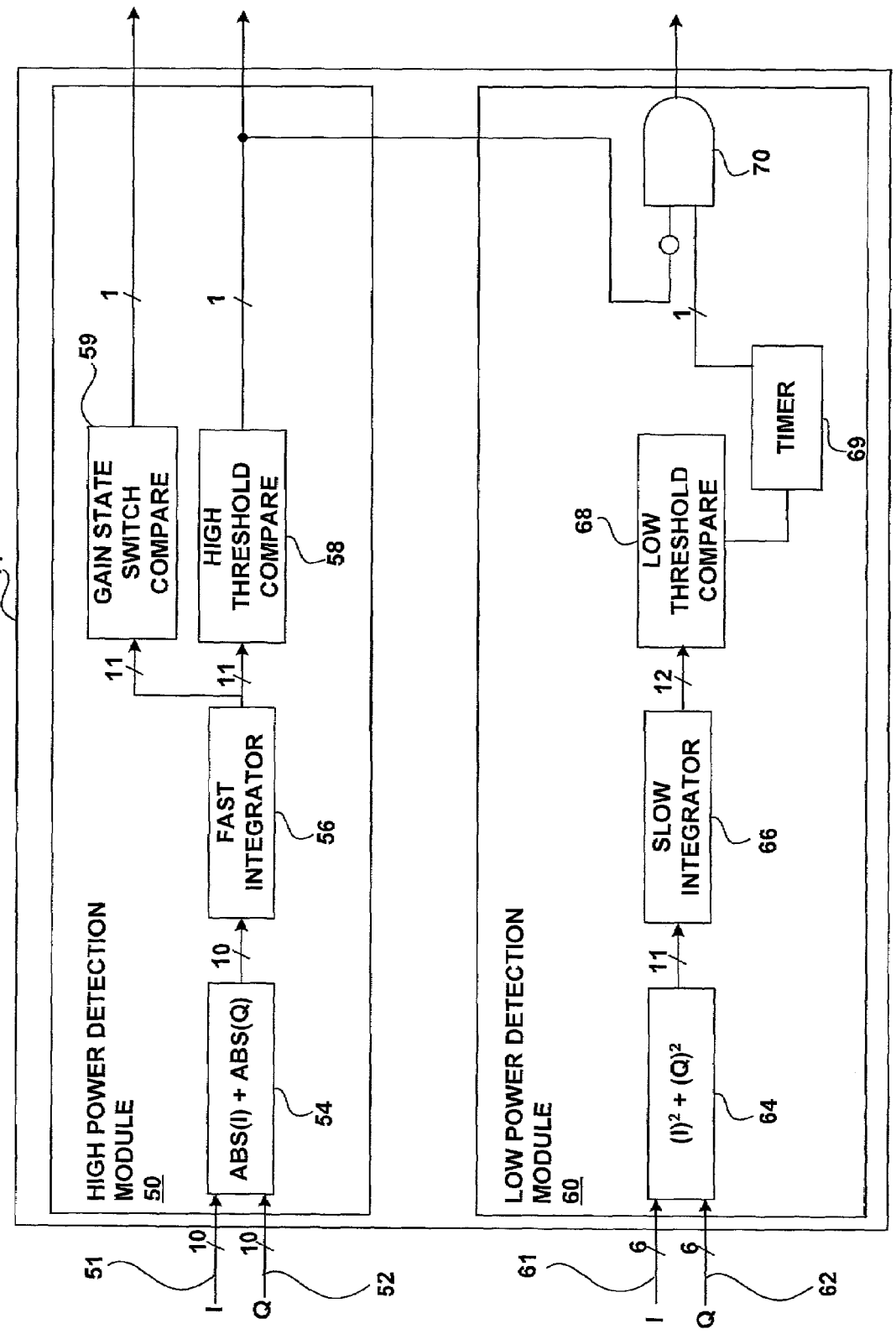
FIG. 4 is a block diagram of a power detector implementing a plurality of power detection modules for use in a WCD.

FIG. 4 is a more detailed block diagram of an exemplary implementation of power detector 44. As illustrated, power detector 44 implements a plurality of power detection modules. In the illustrated example, two power detection modules are implemented, although this disclosure is not limited in that respect. In other words, for some wireless networking standards, such as standards not yet developed, additional power detection modules may also be useful. For example, power detector 44 may incorporate additional power detection modules to differentiate between additional power levels, e.g., high, medium, and low power levels.

In the illustrated example of FIG. 4, power detector 44 includes a high power detection module 50 and a low power detection module 60. I- and Q-baseband samples are received from fine DC removal unit 42 at inputs 51, 52, 61, and 62. As illustrated in FIG. 4, only the six least significant bits (LSB) may be received by low power detector 60 at inputs 61 and 62. Lower power signals will generally have zero values for the most significant bits. Thus, by providing only some of the least significant bits at inputs 61 and 62, components of low power detection module 60 can be simplified.

In high power detection module 50, a power estimator 54 estimates the power contained in the I- and Q-baseband components at inputs 51 and 52 using one technique, e.g., the sum of the magnitudes of the I- and Q-baseband components. This sum is provided to a fast integrator 56 which may implement an infinite impulse response (IIR) filter having a tap weight value of, for example, 0.75. Fast integrator 56 integrates over a smaller effective window than slow integrator 66 in low power detection module 50. However, the actual speed of the integrators may vary according to implementation.

By way of example, fast integrator 56 may integrate the baseband samples over a sliding effective window of 8 samples, or more or less samples by changing the tap weight value if desired. By integrating over a relatively small window, fast integrator can generate an average power estimate very quickly. Fewer samples result in less accuracy, but more samples take a longer time to integrate. For example, the integration time of 2 samples received at a rate of 22 MHz may be approximately 0.09 μsec., the integration time of 4 samples received at a rate of 22 MHz may be 0.18 μsec., the integration time of 8 samples received at a rate of 22 MHz may be 0.36 μsec., and so forth.

The accuracy of signal estimation using fast integrator may be sufficient for signal detection of high power signals. Importantly, after detecting a high power signal, the gain state may need to be changed at receiver 22, and therefore time is of the essence when a high power signal is detected. The average power estimate generated by fast integrator 56 is provided to one or more compare units which compare the average estimate to one or more programmable thresholds in order to determine whether a high power signal is present and whether the gain state needs to be changed. For example, if the average power estimate is larger than the high threshold, high threshold compare unit 58 outputs a one bit value to indicate that a high power signal was detected. Also, if the average power estimate is larger than a gain-state-switch threshold, gain-state-switch compare unit 59 outputs a one bit value to indicate that a high power signal was detected and the gain state needs to be reduced. For example, the threshold programmed into gain-state-switch compare unit 59 may be higher than the threshold programmed into high threshold compare unit 58. Additional comparisons can also be made.

In some cases, one or more of the programmable thresholds may be dynamically established in order to avoid power detection problems associated with jammer signals. Jammer signals refer to noise signals received by WCD 10 that do not correspond to data packets. Jammer signals may be caused by signals sent from other devices operating according to protocols not supported by WCD 10, signals emitted from microwave ovens, cordless telephones, other electromagnetic emitting devices, or the like.

Low power detection module 60 operates in parallel with high power detection module 50 in order to detect low power signals. Low power detection module 60 may operate more slowly and at a higher accuracy than high power detector 50. This is acceptable because it is generally known that if a low power signal is detected, the gain state will not need to be reduced at receiver 22. Therefore, low power detection module 60 may integrate over a much larger effective window than high power detection module 60 when calculating the average power estimate, hence the term slow integrator 66. It should be noted again, however, that the terms slow integrator 66 and fast integrator 56 are relative terms that describe the size of the sliding window of the integrators. The actual speed of the integration may vary for different implementations.

In low power detection module 60, a power estimator 64 estimates the power contained in the I- and Q-baseband components at inputs 61 and 62 using a different technique than high power detection module 50, e.g., the sum of the squares of the I- and Q-baseband components. In some cases, however, the same summing technique can be used for different power detection modules that integrate over different sliding windows. In the illustrated example, the sum of the squares is provided to a slow integrator 66, which may implement an infinite impulse response (IIR) filter having a tap weight value of, for example, 0.9921875 or 0.984375. Slow integrator 66 integrates over a larger integration time, i.e., a larger effective window, than the fast integrator 56 in high power detection module 50. As mentioned above, however, the actual speed of the integrators may vary according to implementation.

By way of example, slow integrator 66 may integrate the baseband samples over a window of 128 samples, 256 samples, or a smaller or larger amount of samples by changing the tap weight value if desired. By integrating over a relatively large effective window, slow integrator 66 can generate an average power estimate that is very accurate. For example, the integration time of 64 samples received at a rate of 22 MHz may be approximately 2.9 msec., the integration time of 128 samples received at a rate of 22 MHz may be 5.8 msec., the integration time of 256 samples received at a rate of 22 MHz may be 11.6 msec., the integration time of 512 samples received at a rate of 22 MHz may be 23.3 msec., and so forth.

The accuracy of signal estimation using slow integrator 60 may be sufficient for signal detection of low power signals. The fact that integration times are significantly larger than in the high power detection module 50 does not matter, because when low power signals are detected the gain state may not need to be reduced. The average power estimate generated by slow integrator 66 is provided to low threshold compare unit 68, which compares the average estimate to a programmable threshold in order to determine whether a low power signal is present. If so, low threshold compare unit 68 outputs a one bit value to indicate that a low power signal was detected.

Logic may coupled to the first and second power detection modules to ensure that a second power indicator will not be generated in the event that a first power indicator is generated. For example, timer unit 69 may be added to low power detection module 60 in order to ensure that a low power indicator is never generated before a high power indicator. AND gate 70 with an inverting input coming from the output of high threshold compare unit 58 may be used to ensure that a low power indicator is never generated in the event that a high power indicator is generated. In other words, timer unit 69 may add a delay to allow power detection module 60 to verify that high threshold compare unit 58 did not generate the high power indicator. Then, AND gate 70 generates the low power indicator only if low power threshold compare unit 68 determines that the average estimated power exceeds the programmed low threshold and high power threshold compare unit 58 determines that the average estimated power does not exceed the programmed high threshold. Accordingly, if the high power indicator is generated, the low power indicator will not also be generated. Similar gates may also be added so that a high power signal is not generated if a gain-state-switch signal is generated by high power detection module 50.

Like the thresholds programmed in the high power threshold compare unit 58 and gain-state-switch compare unit 59, the low power threshold in the low power threshold compare unit 68 may be programmable, and possibly dynamically established in order to avoid power detection problems associated with jammer signals.

The high and low power indicator signals may be used to control a number of aspects of the operation of WCD 10. For example, if WCD 10 incorporates multiple antennas, the high and low power indicators may be used to select an antenna for receiving a particular signal. In addition, these power indicators may be used as part of the gain state selection process as described herein. In particular, the gain state may be reduced only when a high power signal exceeds the threshold programmed in gain-state-switch compare unit 59. In different embodiments, high power detection module 50 may include a number of different programmable thresholds that are compared to the average power estimate. In any case, the detected average power of the high power signal may be used to more quickly identify the correct gain state. Other implementations or modifications could also be used.

As mentioned above, the threshold values of compare units 58, 59, 68 may be dynamically adjustable. Adjusting the threshold values may be desirable, for example, to compensate for interference from jammers, such as transmitters that operate according to a wireless standard not supported by WCD 10, cordless telephones, microwave ovens, or any other electromagnetic radiation emitting device. Jammer signals refer to any RF signal that can be received by WCD 10 but is not supported by WCD 10. Jammer signals can be either constant or intermittent. Constant jammer signals are essentially equivalent to a constant thermal noise present on a channel. It is undesirable for WCD 10 to issue a signal indicator in response to a constant jammer signal or thermal noise because it may prevent WCD 10 from receiving a signal supported by WCD 10. For example, if an intended 802.11b signal arrives, WCD 10 may not capture the signal because if it spends too much time performing RF training on the constant jammer signal or noise.

Accordingly, to reduce the likelihood of generating a signal detection indicator in response to a constant jammer signal or noise, the threshold values may be dynamically adjustable based on the probability of a false alarm. For example, the thresholds may move up or down over time, or may move up or down based on the magnitude of current estimates. Additionally, the initial gain state may vary over time in order to make jammer signals statistically less likely to negatively impact performance of WCD 10. These or other techniques may be used to reduce the negative impact of jammer signals.

Figure 5:
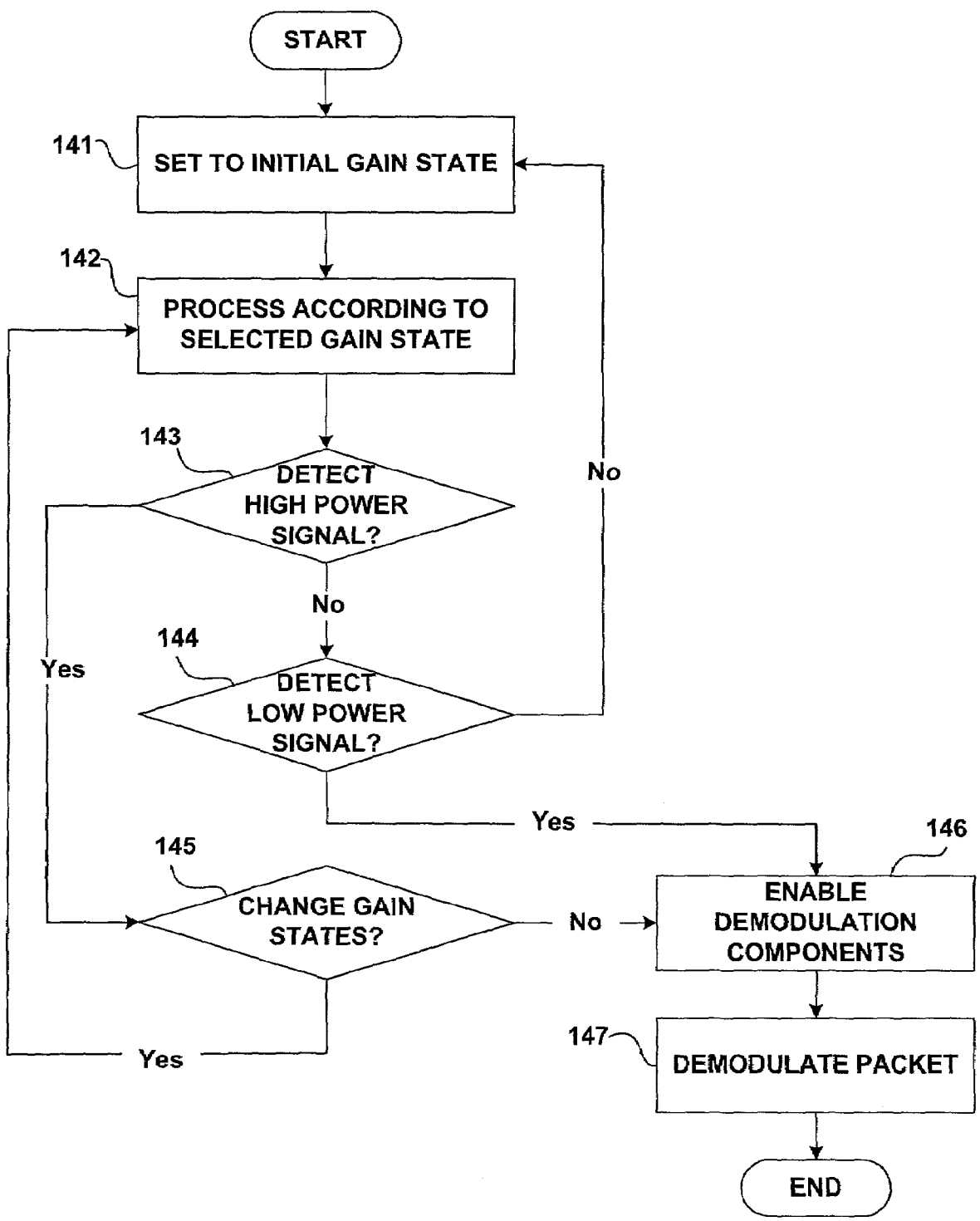
FIG. 5 is a flow diagram illustrating signal processing techniques that can be implemented in a WCD.

FIG. 5 is a flow diagram illustrating a signal processing technique that may be performed by a wireless communication device. When WCD 10 receives an RF signal such as a packet modulated according to an IEEE 802.11 standard, WCD 10 sets to an initial gain state (141). WCD 10 then processes the received signal according to the selected gain state (142). In most cases, the initially selected gain state is the highest gain state. However, the techniques described herein are not limited in that respect. The selected gain state sets the gain of one or more amplifiers or mixers within WCD 10, including for example, amplifier 33. Modem 26 estimates the power associated with the received signal using a plurality of power detection algorithms.

For example, modem 26 may implement separate algorithms to detect low power signals and high power signals such as by implementing a low power detection module 60 and a high power detection module 50. If a high power signal is detected (yes branch of 143), it must be determined whether to change gain states (145). In some cases, this determination may be made based on the strength of the detected high power signal, and in other cases, the determination of whether to change gain states can be made based on a separate determination of whether one or more components of WCD 10 are overloaded or saturated. For example, it may be necessary to change gain states if A/D converter 40 is saturated. Additionally or alternatively, it may be necessary to change gain states if DVGA 46 is overloaded, i.e., unable to sufficiently scale the baseband samples. In any event, by detecting the high power signal (143) very quickly as outlined above, gain states can be changed within the time constraints imposed by wireless networking standards such as IEEE 802.11b, IEEE 802.11a, or IEEE 802.11g. If the gain state needs to be changed, modem 26 may send a signal to receiver 22 in order to adjust the gain state stored in gain state unit 32.

If a high power signal is not detected (no branch of 143), WCD 10 determines whether a low power signal is detected. In particular, modem 26 of WCD 10 may implement a low power detection module 60 that implements a different algorithm than high power detection module 50. As described above, low power detection module 60 can operate in parallel with high power detection module 50. Low power detection module may sum squares of the baseband samples, and/or may integrate over a much larger effective window of digital samples than high power detection module 50. In any event, low power detection module 60 may be more adept at detecting low power signals. The fact that low power detector 60 takes longer to detect signals than high power detector 50 may be of little concern since the gain state is not reduced if a high power signal is not detected.

Once a signal has been detected and the gain state is correct, modem 26 may enable demodulation components (146) such as DVGA 46 and demodulation unit 48. In particular, gain control unit 47 may enable these components upon receiving a power indicator signal from power detector 44. If a high power signal is detected and the gain state needs to be changed, the demodulation components may or may not be enabled specifically at that point. In either case, the demodulation components should eventually be enabled when both a signal is detected and the gain state is correct. Then, once the demodulation components are enabled, WCD 10 can demodulate the packet, such as by providing properly trained baseband samples of the packet to demodulation unit 48.

Any number of gain states can be supported. Importantly, the technique illustrated in FIG. 5 can be performed in less than approximately 20 μsec. when three possible gain states are supported by implementing a high power detection module and a low power detection module as outlined above. In that case, the gain state selection process may involve processing a received packet according to a first gain state, detecting whether the gain state is too large, possibly reducing the gain state, detecting whether the reduced gain state is too large, possibly reducing the gain state again, and so forth. Accordingly, the gain state selection process may involve a series of incremental increases or decreases, i.e., from gain state to gain state, until an appropriate gain state has been selected. Importantly, the gain state selection process is performed within the time allocated by wireless networking standards. In this manner, it can be ensured that all of the RF training tasks associated with packet reception can be performed within the time allocated for RF training.

Various techniques for processing wireless packets have been described as being implemented in hardware. Example hardware implementations may include implementations within a DSP, an application specific integrated circuit (ASIC), a field programmable gate array (FPGA), a programmable logic device, specifically designed hardware components, or any combination thereof. In addition, one or more of the techniques described herein may be partially or wholly executed in software. In that case, a computer readable medium may store computer readable instructions that can be executed by a processor to carry out one of more of the techniques described above. Also, various other modifications may be made without departing from the spirit and scope of the invention. Accordingly, these and other embodiments are within the scope of the following claims.

The invention claimed is:

1. A method comprising:
   receiving a packet according to a wireless networking protocol;
   selecting a first discrete gain state for at least one analog circuit for scaling a received RF waveform from among a plurality of discrete gain states;
   processing the packet with the at least one analog circuit according to the first discrete gain state;
   detecting a baseband power level from a digital baseband signal associated with the packet processed according to the first discrete gain state using first and second algorithms having different power detection characteristics, the first algorithm being a first high-power detection algorithm and the second algorithm being a concurrent second low-power detection algorithm;
   selecting a second discrete gain state for the at least one analog circuit from among the plurality of discrete gain states if the baseband power level is greater than a threshold; and
   processing the packet with the at least one analog circuit according to the second discrete gain state if selected based on the baseband power level and the threshold.

2. The method of claim 1, wherein processing the packet with the at least one analog circuit according to the first discrete gain state comprises:
   adjusting the gain of one or more amplifiers according to the selected discrete gain state, the one or more amplifiers being used to process a received RF signal corresponding to the packet; and
   amplifying the received RF signal with the one or more amplifiers.

3. The method of claim 1, further comprising:
   enabling demodulation components upon detecting the baseband power level associated with the packet; and
   demodulating the packet using the demodulation components.

4. The method of claim 1, wherein selecting the first discrete gain state comprises selecting a largest discrete gain state among the plurality of discrete gain states as the first discrete gain state.

5. The method of claim 1, further comprising:
   selecting a third discrete gain state upon identifying that a baseband power level from the digital baseband signal associated with the packet when processed according to the second discrete gain state is still greater than the threshold.

6. The method of claim 1, wherein selecting the second discrete gain state occurs within a training period associated with the packet.

7. The method of claim 6, wherein the training period corresponds to a training period for a wireless standard selected from the following group: IEEE 802.11a, IEEE 802.11b, and IEEE 802.11g.

8. The method of claim 1, wherein detecting the baseband power level comprises detecting the baseband power level from the digital baseband signal associated with the packet using a plurality of power detection modules, wherein each of the power detection modules uses a power detection algorithm that is different from that of the other power detection modules.

9. The method of claim 8, wherein a number of samples integrated by a first power detection module is different than a number of samples integrated by a second power detection module.

10. A method comprising:
    determining received power of a digital baseband signal over an entire bandwidth of the digital baseband signal using first and second algorithms having different power detection characteristics, the first algorithm being a first high-power detection algorithm and the second algorithm being a concurrent second low-power detection algorithm;
    generating a first power indicator when the received power of the digital baseband signal as calculated using the first algorithm exceeds a first threshold; and
    generating a second power indicator when the received power of the digital baseband signal as calculated using the second algorithm exceeds a second threshold.

11. The method of claim 10, further comprising:
    enabling demodulation components upon generating the first or second power indicator; and
    demodulating the digital baseband signal using the demodulation components.

12. The method of claim 10, wherein the first algorithm calculates power by integrating sums of magnitudes of in-phase and quadrature-phase components of samples of the digital baseband signal.

13. The method of claim 12, wherein the second algorithm calculates power by integrating sums of squares of in-phase and quadrature-phase components of samples of the digital baseband signal, wherein a number of samples integrated by the second algorithm is different than a number of samples integrated by the first algorithm.

14. A method comprising:
    determining received power of a digital baseband signal over an entire bandwidth of the digital baseband signal using first and second algorithms, the first algorithm being a first high-power detection algorithm and the second algorithm being a concurrent second low-power detection algorithm;
    generating a first power indicator when the received power of the digital baseband signal as calculated using the first algorithm exceeds a first threshold;
    generating a second power indicator when the received power of the digital baseband signal as calculated using the second algorithm exceeds a second threshold; and
    when the received power as calculated using the second algorithm does not exceed the second threshold, generating an indicator that no signal was detected.

15. A method comprising:
- determining received power of a digital baseband signal over an entire bandwidth of the digital baseband signal using first and second algorithms, the first algorithm being a first high-power detection algorithm and the second algorithm being a concurrent second low-power detection algorithm;
- generating a first power indicator when the received power of the digital baseband signal as calculated using the first algorithm exceeds a first threshold;
- generating a second power indicator when the received power of the digital baseband signal as calculated using the second algorithm exceeds a second threshold;
- generating a third power indicator when the received power of the digital baseband signal as calculated using the first algorithm exceeds a gain-state-switch threshold; and
- upon generating the third power indicator, adjusting a discrete gain state of a wireless communication device.

16. A method comprising:
- determining received power of a digital baseband signal over an entire bandwidth of the digital baseband signal using first and second algorithms having different power detection characteristics, the first algorithm being a first high-power detection algorithm and the second algorithm being a concurrent second low-power detection algorithm;
- generating a gain-state-switch power indicator when the received power of the digital baseband signal as calculated using the first algorithm exceeds a first threshold;
- generating a high power indicator when the received power of the digital baseband signal as calculated using the first algorithm exceeds a second threshold;
- generating a low power indicator when the received power of the digital baseband signal as calculated using the second algorithm exceeds a third threshold; and
- adjusting a gain state of a wireless communication device upon generating the gain-state-switch power indicator.

17. The method of claim 16, wherein adjusting the gain state comprises reducing the gain state.

18. A wireless communication device comprising:
- a receiver that receives a packet according to a wireless networking protocol, the receiver comprising at least one analog circuit block for scaling an RF waveform that processes the packet according to a first discrete gain state among a plurality of discrete gain states and further according to a second discrete gain state among the plurality of discrete gain states if selected based on a baseband power level associated with the packet and a threshold; and
- a modem coupled to the receiver, that selects the first discrete gain state for the at least one analog circuit block used to process the packet, detects the baseband power level from a digital baseband signal associated with the packet processed according to the first discrete gain state using first and second algorithms having different power detection characteristics, the first algorithm being a first high-power detection algorithm and the second algorithm being a concurrent second low-power detection algorithm, and selects the second discrete gain state for the at least one analog circuit block if the baseband power level is greater than the threshold.

19. The wireless communication device of claim 18, wherein the modem includes a plurality of power detection modules that respectively measure power associated with the packet using different algorithms.

20. The wireless communication device of claim 19, wherein the modem selects a largest discrete gain state among the plurality of discrete gain states as the first discrete gain state.

21. A receiver comprising:
- circuitry that receives a packet according to a wireless networking protocol; and
- analog circuitry for scaling an RF waveform that processes the packet according to a first discrete gain state among a plurality of discrete gain states and further according to a second discrete gain state among the plurality of discrete gain states if selected based on a detected baseband power level from a digital baseband signal associated with the packet and a threshold using first and second algorithms having different power detection characteristics, the first algorithm being a first high-power detection algorithm and the second algorithm being a concurrent second low-power detection algorithm.

22. The receiver of claim 21, wherein the first discrete gain state is a largest discrete gain state among the plurality of discrete gain states.

23. The receiver of claim 21, wherein the receiver processes the packet according to the second discrete gain state and adjusts to a third discrete gain state upon receiving a signal that indicates that a baseband power level from the digital baseband signal associated with the packet when processed according to the second gain state is greater than the threshold.

24. A modem comprising:
- a first power detection module that calculates received power of a digital baseband signal over an entire bandwidth of the digital baseband signal using a first algorithm and generates a first power indicator when the received power of the digital baseband signal as calculated using the first algorithm exceeds a first threshold; and
- a second power detection module that calculates received power of the digital baseband signal over the entire bandwidth of the digital baseband signal using a second algorithm and generates a second power indicator when the received power of the digital baseband signal as calculated using the second algorithm exceeds a second threshold, the first and second algorithms having different power detection characteristics, the first algorithm being a first high-power detection algorithm and the second algorithm being a concurrent second low-power detection algorithm.

25. The modem of claim 24, further comprising logic coupled to the first and second power detection modules to ensure that the second power detection module does not generate the second power indicator in the event that the first power indicator is generated.

26. The modem of claim 24, wherein the first algorithm calculates power by integrating sums of magnitudes of in-phase and quadrature-phase components of samples of the digital baseband signal.

27. The modem of claim 26, wherein the second algorithm calculates power by integrating sums of squares of in-phase and quadrature-phase components of samples of the digital baseband signal, wherein a number of samples integrated by the second algorithm is different than a number of samples integrated by the first algorithm.

28. A modem comprising:
- a first power detection module that calculates received power of a digital baseband signal over an entire bandwidth of the digital baseband signal using a first algorithm and generates a first power indicator when the received power of the digital baseband signal as calculated using the first algorithm exceeds a first threshold; and a second power detection module that calculates received power of the digital baseband signal over the entire bandwidth of the digital baseband signal using a second algorithm and generates a second power indicator when the received power of the digital baseband signal as calculated using the second algorithm exceeds a second threshold, the first algorithm being a first high-power detection algorithm and the second algorithm being a concurrent second low-power detection algorithm, wherein the modem generates a third power indicator when the received power of the digital baseband signal as calculated using the first algorithm exceeds a gain-state-switch threshold, and wherein upon generating the third power indicator the modem adjusts a discrete gain state of a wireless communication device.

29. A wireless communication device comprising:
a receiver that receives a packet according to a wireless networking protocol; and
a modem that selects a first discrete gain state for the receiver for processing of the packet, detects a baseband power level from a digital baseband signal associated with the packet processed according to the first discrete gain state, and selects a second discrete gain state for the receiver if the baseband power level is greater than a threshold, wherein the receiver processes the packet with at least one analog circuit block for scaling an RF waveform according to the first discrete gain state and further according to the second discrete gain state if selected based on the baseband power level and the threshold using first and second algorithms having different power detection characteristics, the first algorithm being a first high-power detection algorithm and the second algorithm being a concurrent second low-power detection algorithm.

30. The wireless communication device of claim 29, wherein the modem selects a largest discrete gain state among a plurality of discrete gain states for the at least one analog circuit block as the first discrete gain state.

31. The wireless communication device of claim 29, wherein the receiver adjusts to a third discrete gain state upon receiving from the modem a signal that indicates that a baseband power level from the digital baseband signal associated with the packet processed according to the second discrete gain state is greater than the threshold.

32. The wireless communication device of claim 29, wherein the modem includes:
a first power detection module that calculates power of a digital baseband signal associated with the packet using the first algorithm and generates a first power indicator when the power as calculated using the first algorithm exceeds a first threshold; and a second power detection module that calculates power of the digital baseband signal using the second algorithm and generates a second power indicator when the power as calculated using the second algorithm exceeds a second threshold.

33. The wireless communication device of claim 32, wherein the modem further includes logic coupled to the first and second power detection modules to ensure that the second power detection module will not generate the second power indicator in the event that the first power indicator is generated.

34. The wireless communication device of claim 32, wherein the first algorithm calculates power by integrating sums of magnitudes of in-phase and quadrature-phase components of samples of the digital baseband signal.

35. The wireless communication device of claim 32, wherein the second algorithm calculates power by integrating sums of squares of in-phase and quadrature-phase components of samples of the digital baseband signal, wherein a number of samples integrated by the second algorithm is different than a number of samples integrated by the first algorithm.

36. An apparatus comprising:
means for receiving a packet according to a wireless networking standard;
means for analog processing the packet by scaling a received RF waveform according to a first discrete gain state among a plurality of discrete gain states; and
means for analog processing the packet according to a second discrete gain state if selected based on a detected baseband power level from a digital baseband signal associated with the packet analog processed according to the first discrete gain state and a threshold using first and second algorithms having different power detection characteristics, the first algorithm being a first high-power detection algorithm and the second algorithm being a concurrent second low-power detection algorithm.

37. The apparatus of claim 36, further comprising
means for selecting a largest discrete gain state among the plurality of discrete gain states as the first discrete gain state used for analog processing the packet.

38. The apparatus of claim 36, further comprising
means for determining the baseband power level from the digital baseband signal associated with the packet using first and second algorithms.

39. The apparatus of claim 36, further comprising
means for amplifying a received RF signal according to a selected one of the plurality of gain states.

40. The method of claim 36, wherein the first and second algorithms integrate over different numbers of samples.

* * * * *